ELECTRONIC DIGITAL COMPUTING APPARATUS

Filed Oct. 3, 1949 5 Sheets-Sheet 1

Inventors
F. C. WILLIAMS
T. KILBURN
By Morrison & Hall
Attorneys

ELECTRONIC DIGITAL COMPUTING APPARATUS

Filed Oct. 3, 1949 5 Sheets-Sheet 2

Inventors
F. C. WILLIAMS
T. KILBURN
By Moore and Hall
Attorneys

Inventors
F. C. WILLIAMS
T. KILBURN
By Moore and Hall
Attorneys

Inventors
F. C. WILLIAMS
T. KILBURN
By Moore and Hall
Attorneys

Inventors
F. C. WILLIAMS
T. KILBURN
By Moore and Hall
Attorneys

Patented Mar. 9, 1954

2,671,607

UNITED STATES PATENT OFFICE 2,671,607

ELECTRONIC DIGITAL COMPUTING APPARATUS

Frederic C. Williams, Timperley, and Tom Kilburn, Davyhulme, Manchester, England, assignors to National Research Development Corporation, London, England, a corporation of Great Britain Application October 3, 1949, Serial No. 119,306

Claims priority, application Great Britain October 13, 1948

12 Claims. (Cl. 235—61)

Figure 1:
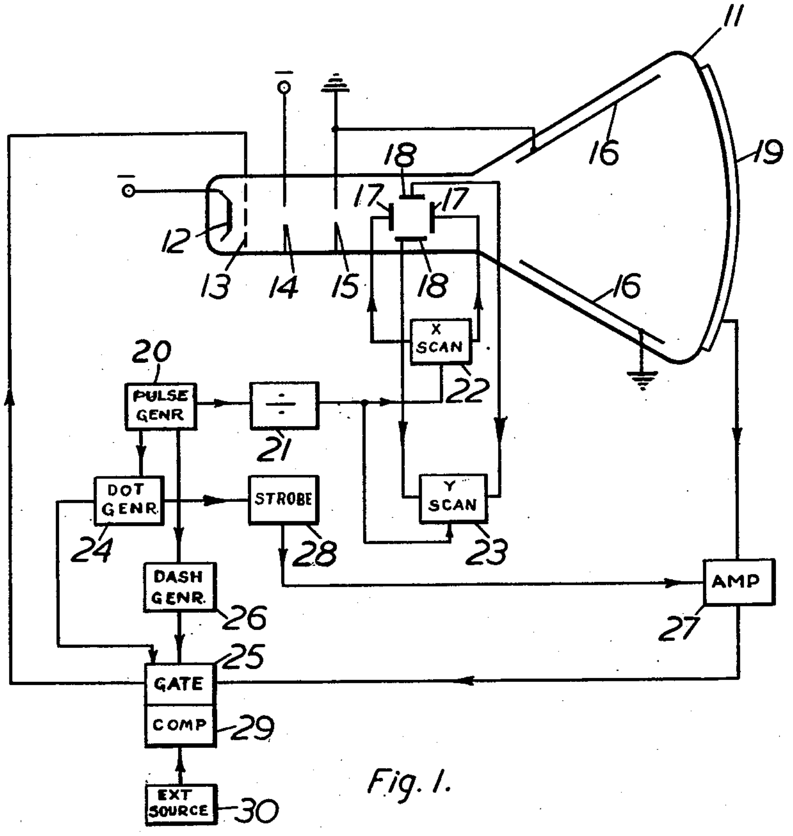

The present invention relates to electronic apparatus of the kind in which signals representative of numerical quantities are combined in an electronic circuit to provide output signals representative of a mathematical operation between numerals represented by the signals fed in. In an apparatus of this kind, it is usually necessary to provide some means of storing signals representative of the quantities to be manipulated so that the numerical quantities can be extracted at appropriate times for feeding into a computing circuit coincidentally with some other quantity or operator. Storing systems for this purpose are described, for example, in co-pending United States patent applications Ser. No. 790,879, filed December 10, 1947, by Frederic C. Williams; Ser. No. 50,136, filed September 20, 1948, by Frederic C. Williams and Tom Kilburn; and Ser. No. 93,612, filed May 16, 1949, by Frederic C. Williams and Tom Kilburn, in which there are described a number of methods of storing information on the screen of a cathode ray tube. The storing systems are also described in a paper by F. C. Williams and T. Kilburn entitled "A Storage System For Use With Binary Digital Computing Machines" and published in the "Proceedings of the Institution of Electrical Engineers," Part III, No. 40, March 1949, pages 81–100. The systems described in patent application Ser. No. 50,136, referred to above, contemplate the use of dots and dashes, or other configurations of elemental charge patterns laid down on the cathode ray tube screen, the various patterns being representative of different characters, for example, the binary digits 0 and 1.

In such systems, according to the nature of the charge pattern developed on the cathode ray tube screen, the initial transient signal obtained when a particular point on the cathode ray tube screen is reirradiated, differs according to whether an area of the screen adjacent the particular point was irradiated subsequently to the irradiation of that particular point. Thus, in the system above referred to, in which the digits 0 and 1 are represented by dots and dashes, the drawing out of the area irradiated by the beam into a dash constitutes irradiation of an adjacent area, so that the initial transient obtained when the beginning of the dash is re-irradiated is in the form of a positive-going pulse. In the case of the dot, however, the initial transient obtained is a negative-going pulse. According to the nature of the signal pulse derived on re-irradiation of an elemental charge pattern, therefore, "instructions" can be given to modulating means controlling the cathode ray tube beam to ensure that it shall be switched off, or kept on, in the appropriate manner to regenerate the charge pattern on the screen.

During the regeneration process above referred to, the output signals obtained from the tube represent, as will be apparent, the information already stored on the cathode ray tube screen, and the regeneration process, therefore, involves a reading process, so that the information in the store can be read off in this way, and fed to a computing circuit as may be desired. The present invention relates to a method of erasing, correcting and re-writing information in a store of the kind above described, and has for its object, to provide arrangements for this purpose.

In the systems described in co-pending patent application Ser. No. 50,136, above referred to, one principle of operation involves the writing of information into a store by irradiating small areas of the screen at each exploration of the store, and extinguishing the beam immediately if the information to be stored at any given point is of one kind, for example, the digit 0. If, however, information of another kind, for example, the digit 1 is to be recorded at a given point, the beam is maintained switched on for an additional short period, during which the beam may be moved or de-focused in order to extend the area of irradiation. The process of regeneration, therefore, involves merely the allowance, or the inhibition of this further period of irradiation by suitable modulating means. In other words, the initial irradiation of the screen at the given point takes place in any event. The information, whether the continued irradiation shall be permitted or not is derived from this initial irradiation and is, therefore, available before the additional irradiation is in question. This fact is employed in carrying out the present invention, by providing means in a regenerative store of the kind described above for operating upon the initial transient signal obtained from a reading of a given point of the store by means of signals from an external source, to control the signals fed back to the modulating means, and determine the form of signal re-written into the store at the point in question.

According to the invention, in one aspect, therefore, a digital computing apparatus employing a cathode ray tube store for information to be employed in a computation, comprises a cathode ray tube store device having a storage screen, a pick-up electrode associated with said screen, controlling means for controlling the irradiation of said screen, and a regeneration circuit between said pick-up electrode and said controlling means, adapted to operate said controlling means to regenerate information already stored on said screen, and in said regeneration circuit, a computation circuit adapted to receive signals from said pick-up electrode and from an external source, and to determine the signal supplied to said controlling means in accordance with a mathematical process effected between the signals read out from said store and the signals from said external source.

According to an embodiment of the invention electronic digital computing apparatus having a store of the type comprising an insulating recording surface, means for producing an electron beam at a velocity such that, when the beam strikes the surface the number of secondary electrons liberated is greater than the number of primary electrons arriving, means for causing the beam to explore said surface, modulating means for modulating the electron beam to give rise to a charge pattern on said surface corresponding to modulations characteristic of a number to be recorded, signal pick-up means associated with said surface, and a regeneration circuit connecting said pick-up means to said modulating means; said apparatus being characterised in this that said regeneration circuit includes a computing circuit, means for feeding to said computing circuit signals representative of a stored number and derived from said pick-up means, means for feeding to said computing circuit signals representative of a number and derived from an external source, and means for controlling said modulating means in accordance with the output signals from said computing circuit, which are representative of an answer number derived from a mathematical process effected between the two numbers fed into the computing circuit, thereby to store said answer number in said store.

Figure 4:
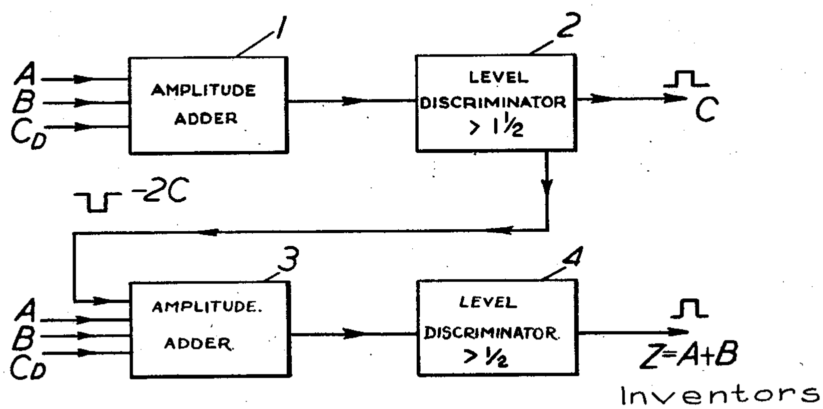
Figure 2:
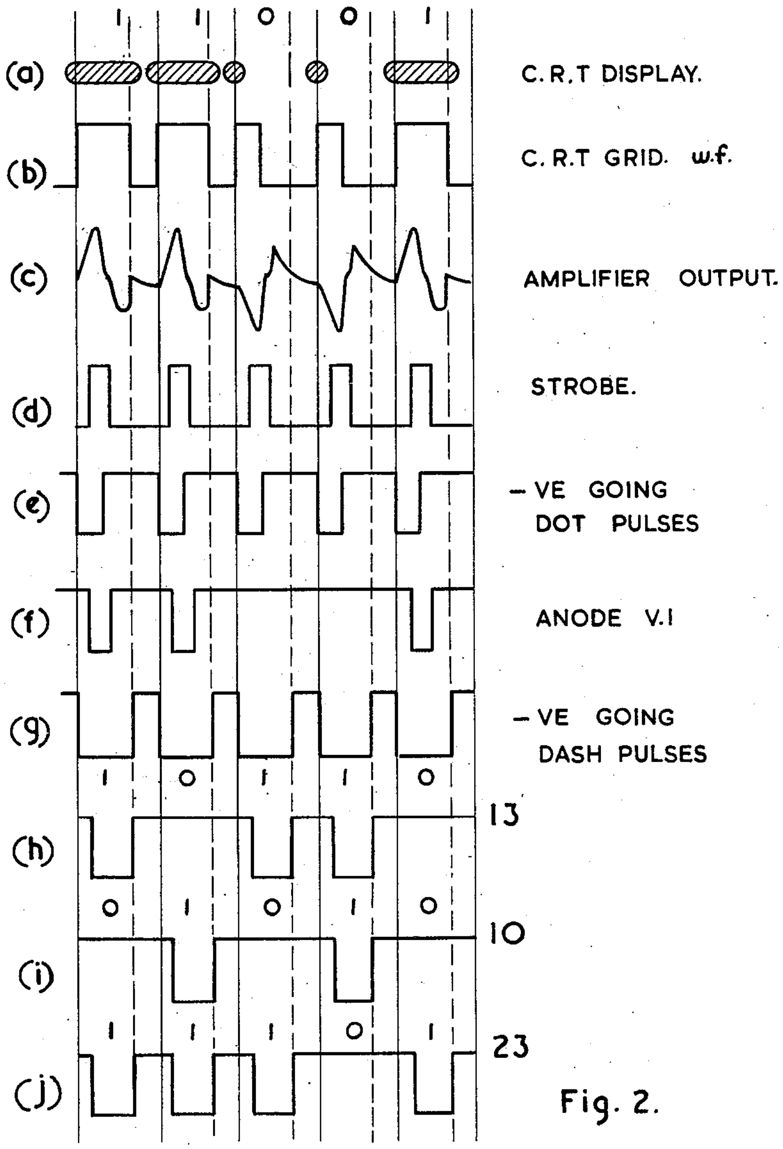
Figure 3:
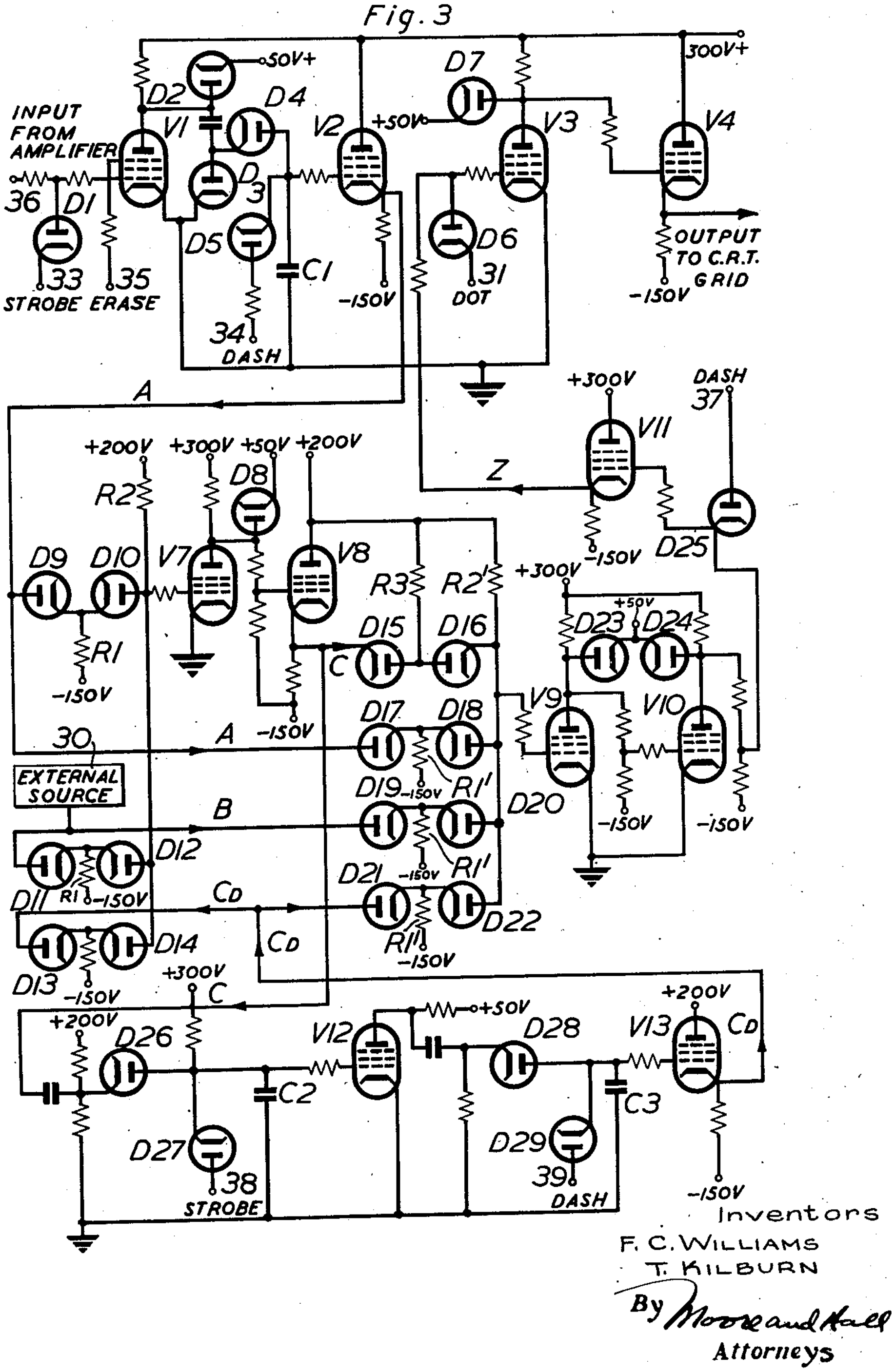
Figure 5:
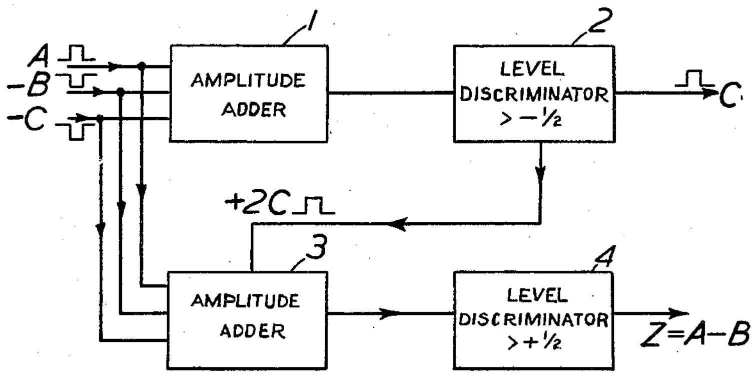
Figure 6:
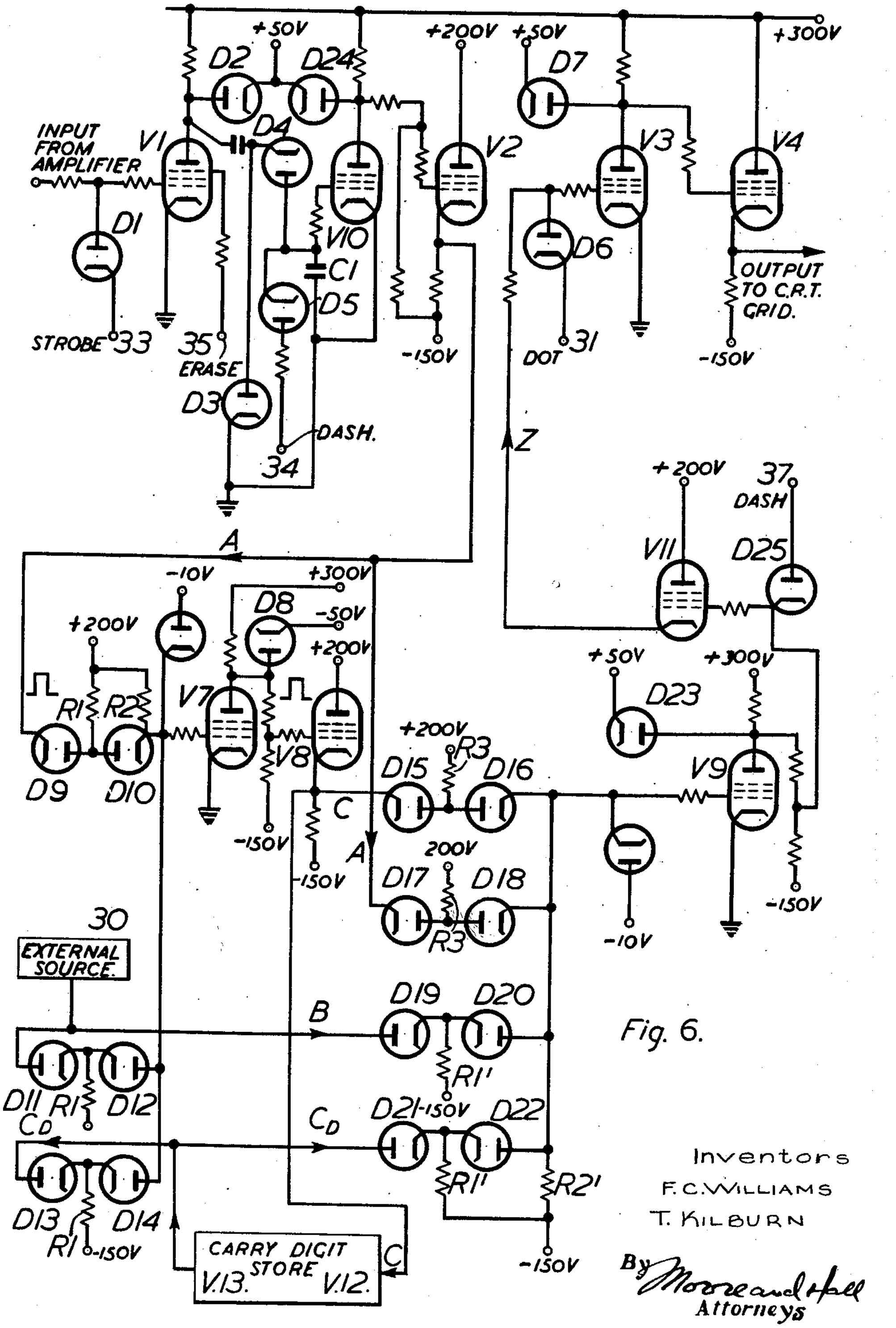

In order that the invention may be more clearly understood and readily carried into effect reference will now be made to the accompanying drawings which illustrate by way of example an application of the invention to the storage system described in our co-pending patent application Ser. No. 50,136, filed September 20, 1948. In the drawings Fig. 1 shows in block schematic form computing apparatus according to this invention, Fig. 2 shows waveforms illustrating the operation of the apparatus shown in Fig. 1, Fig. 3 shows a combined gate circuit and adding circuit which may be employed in the apparatus of Fig. 1, Fig. 4 shows diagrammatically and in block schematic form the adding circuit of Fig. 3, Fig. 5 shows diagrammatically and in block schematic form a subtracting circuit shown more fully in Fig. 6 and Fig. 6 shows a combined gate circuit and subtracting circuit which may be employed in the apparatus of Fig. 1.

Referring first to Fig. 1, reference numeral 11 denotes a normal type cathode ray tube which is employed as a digit store of the kind described in co-pending Patent Application Ser. No. 50,136, filed by us September 20, 1948, and referred to in the said paper. Numbers in binary form are stored as charge patterns on each of 32 parallel, e. g. horizontal, lines of the cathode ray tube screen, the digit "0" being represented by a dot charge and the digit "1" by a dash charge. Each line contains a charge pattern representing 32 such digits. A part of the display representing the binary number 11001 is shown in Fig. 2(*a*). The tube comprises a cathode 12, a control grid 13, a first anode 14, a second anode 15, a third anode 16 constituted by a conducting coating on the inside wall of the tube adjacent to the screen and X and Y reflecting plates 17 and 18 respectively. The second and third anodes 15 and 16 are held at earth potential and the remaining electrodes have negative potentials applied to them to cause the tube to operate at a beam velocity such that when a spot on the screen is bombarded with electrons from the cathode the number of secondary electrons emitted from the spot exceeds the number of primary electrons which arrive. A metallic signal pick-up electrode 19 is held securely on the outside wall of the tube adjacent to the screen.

A generator 20 of voltage pulses having a rectangular waveform produces regularly recurring pulses which are used to synchronise the operation of all the correlated parts of the apparatus. These pulses are fed to a divider circuit 21 which reduces the pulse frequency rate by a chosen factor to provide synchronising pulses for the X time-base generator 22 and the Y time-base generator 23 which provide deflection voltages which are applied to the X and Y deflector plates 17 and 18 respectively to set up a television type raster of 32 horizontal lines. Between lines the electron beam of the cathode ray tube is blacked out. The particular form of Y-scan employed is fully described in our patent application Ser. No. 93,612, filed May 16, 1949 and the aforementioned paper; briefly it causes the lines to be explored sequentially but alternately with a selected line. Each line is divided into 32 elements and during the scan of a line each element is normally illuminated by applying dot pulses from a dot pulse generator 24 through a gate circuit 25 (later to be described) to the control grid 13 of the cathode ray tube. The dot pulse generator 24 is synchronised by the pulse generator 20. However, an element can also be illuminated by applying to the cathode ray tube grid dash pulses obtained from a dash pulse generator 26 and fed to the grid through the gate circuit 25. The dash pulse generator 26 is also synchronised by the pulse generator 20. The voltage waveform applied to the cathode ray tube grid to produce the display shown in Fig. 2(*a*) is shown in Fig. 2(*b*). The five pulses shown in Fig. 2(*b*) which are positive-going are thus in order, a dash pulse, a dash pulse, a dot pulse, a dot pulse and a dash pulse.

Reference to our co-pending patent application Ser. No. 50,136, filed September 20, 1948, or the said paper will show that when an element of the cathode ray tube screen is illuminated during a scan, a transient pulse signal is generated in the pick-up electrode 19 having a sign depending on whether a dot or dash is recorded on the element. If a dot charge is present a negative signal will be generated and if a dash charge is present a positive signal will be generated. The signals generated in the pick-up electrode 19 when the display is that shown in Fig. 2(a) are shown in Fig. 2(c). Signals from the pick-up electrode 19 are amplified in an amplifier 27 and fed to the gate circuit 25. The output voltage from the amplifier 27 is sampled at chosen instants by applying to its output positive-going strobe pulses shown in Fig. 2(d). Thus only those parts of the amplifier output voltage occurring during strobe pulses are applied to the gate circuit 25. These strobe pulses are obtained from a strobe generator 28 synchronised by the dot pulse generator 24. In accordance with this invention the gate circuit 25 includes a computing circuit 29.

The operation of the system will first be described assuming the computing circuit 29 not to be present. If a positive transient pulse signal obtained by illuminating a dash charge on the cathode ray tube screen is fed to the gate circuit 25, the circuit operates to cause this dash charge to be regenerated by applying a dash pulse from the dash pulse generator 26 to the cathode ray tube grid. Otherwise a dot pulse from the dot pulse generator 24 will be applied to the cathode ray tube control grid. Thus the number previously stored will be rewritten on the scanned line of the cathode ray tube, this process being the normal regeneration process.

When the computing circuit 29 is present a pulse is fed into the computing circuit 29 each time a transient pulse output from the amplifier 27 indicates the presence of a dash charge on the cathode ray tube screen. Thus there is fed into the computing circuit 29 a signal representing the binary number in the line being scanned, each "1" digit being represented by a pulse. There is also injected into the computing circuit 29 pulses representing a binary number and obtained from an external source 30. The timing is such that pulses representing "1" digits of equal significance occur simultaneously. The computing circuit 29 gives output pulses representing an answer number derived from a mathematical process effected between the two numbers fed into it respectively from the cathode ray tube store and the external source 30. The output pulses from the computing circuit 29 are fed to the gate circuit 25 whose output is a train of pulses representing the answer number in which the digit "1" represented by a dash pulse and the digit "0" by a dot pulse. This train of pulses is applied to the cathode ray tube grid 13 to modulate the beam intensity. Thus a charge pattern representing the answer number is stored on the scanned line in place of the number previously stored.

Reference will now be made to Fig. 3 which shows a combined gate circuit and adding circuit and the means for strobing the output from the amplifier 27. Valves V1—V4 comprise the simple gate circuit 25 required to provide regeneration of stored charge information while the circuit comprising valves V7—V13 is the computing device 29 (in this example an adding circuit), which provides the new input signal to the writing portion of the gate circuit.

The operation of the gate circuit alone will first be described on the assumption that the voltage at the cathode of valve V2 is fed directly to the control grid of the valve V3, i. e. that the computing circut 29 is absent. Negative-going dot pulses, Fig. 2(e), from a resting level of +5 volts, are fed via terminal 31 and diode D6 to the control grid of valve V3 and cut-off its anode current. The resulting pulses at the anode of this valve, consisting of a train of positive-going dot pulses, are fed to the control grid of a cathode follower valve V4 and the positive-going dot pulses across the cathode load resistance of this valve are fed to the cathode ray tube grid via a D. C. restoring diode circuit to produce a standard display of dots.

In response to the detection of a positive transient pulse, due to a stored "1" digit, in the output of the amplifier 27, the portion of the gate comprising valves V1 and V2 operates to extend the dot pulse on the grid of the valve V3 into a dash pulse. The output voltage of amplifier 27 biassed to −15 volts is fed via terminal 36 to the control grid of valve V1 together with the positive-going strobe pulses, Fig. 2(d), which are fed via terminal 33 and diode D1 from a resting level of −10 volts. The anode current of valve V1 is normally cut off and is caused to flow only when a positive pulse from the amplifier coincides with a positive strobe pulse. A negative pulse is thus produced at the anode of valve V1 in response to a positive pulse from the amplifier due to detection of a dash charge on the cathode ray tube screen. The output pulses at the anode of the valve V1 due to the display shown in Fig. 2(a) are shown in Fig. 2(f). The pulses at the anode of valve V1 which are from a resting level of +50 volts, as defined by the diode D2, are fed to the control grid of a cathode follower valve V2, the upper grid voltage limit of which is defined at zero by conduction of the diodes D3 and D4 and the lower grid voltage limit of which is defined at −15 volts by conduction of diode D5 to which is fed via terminal 34 negative-going dash pulses, Fig. 2(g). The cathode of the valve V2 will thus swing in voltage between the approximate limits of +3 and −12 volts, which voltages are sufficient to cause respectively full anode current and zero anode current in the valve V2. The condenser C1 prevents the control grid voltage of valve V2 changing unless it is driven, so that after a negative pulse is applied to it from the anode of valve V1, the control grid of valve V2 will remain at −15 volts for the duration of the dash pulse applied to the anode of diode D5. At the end of the dash pulse the grid voltage of valve V2 will be driven to zero and remain at that level until another negative pulse is obtained from the anode of valve V1.

The action of this portion of the circuit may be summarised as follows: If the display at a certain element on the cathode ray tube screen was previously a dot, a negative pulse will be delivered by the amplifier 27 during the stroke pulse period when the element is bombarded again. Since the control grid of valve V1 is biased so that anode current in this valve is normally cut-off, the negative pulse has no effect, the gate circuit is inoperative and a dot will be re-written onto the element considered, by the action of a dot pulse applied to the cathode ray tube grid. If, however, the display was previously a dash, a positive pulse will be obtained from the amplifier 27, which causes the valve V1 to conduct. The resulting negative pulse at the anode of valve V1 drives the grid of valve V2 to −15 volts where it remains until driven back to zero volts by the dash pulse. The anode current of valve V3 is therefore cut off initially by the dot pulse applied to its grid and held off till the trailing edge of a dash pulse due to the pulse applied to the grid from the cathode of V2. The result is that the dash display is reproduced at the particular element concerned on the cathode ray tube screen. It can thus be seen that the circuit of valves V1—V4 provides a normal dot display which may be converted to a dash display by the overriding control effected by pulses fed to the control grid circuit of valve V3. In the actual circuit of Fig. 3. the overriding pulses are provided, not by the cathode voltage of V2, which is effectively the number derived from the cathode ray tube store but, as will be seen, by pulses derived from the adding circuit. If it is desired to erase or ignore any stored information on the cathode ray tube and merely to write in a number, derived from the adding circuit and fed to the grid of valve V3, or fed in as a suitable pulse to activate valve V2 appropriately (assuming that the cathode of valve V2 feeds the control grid of valve V3 directly), then the regenerative loop may be broken by applying a negative pulse of the desired timing and duration, from an "erase" input terminal 35 to the suppressor grid of valve V1.

The adding portion of the gate circuit will now be described. The binary system of notation recognises only two figures, namely "0" and "1." The figure "1" can therefore be represented by the presence of a signal voltage and "0" by the absence of such voltage. In the process of addition, the addition of "1" and "1" gives "0" in the answer, with "1" to carry into the column of the next higher significant figure. In adding the next column, therefore it is necessary to take into account not only the two figures of the respective numbers to be added but also any figure to be added in, carried from the previously added column. An adding circuit, therefore, is required to accept three possible inputs, i. e. the two digits of the column to be added and a digit carried from a previously added column, to pass out an answer in the form of a "1" signal or a "0" signal and to feed back to the input for use in adding the next column a carry signal which may be a "0" or a "1."

Referring once more to Fig. 2, waveform (*h*) shows the decimal number thirteen as represented in the computing circuits now to be described. The number in binary form is 10 11 (i. e. $1.2^0+0.2^1+1.2^2+1.2^3$) and is represented by pulse, no pulse, pulse, pulse. These pulses are negative-going and are termed computer pulses. Their leading edges are coincident with the leading edges of the strobe pulses and their trailing edges are coincident with the trailing edges of the dash pulses. The waveform (*i*) represents the binary number 0101 (i. e. ten) and the waveform (*j*) the sum of the two numbers shown in waveform (*h*) and (*i*) i. e. 11101 (twenty-three).

In order to understand the operation of the adding circuit shown in Figs. 3 and 4 it is first necessary to consider the Table 1 below which shows the eight possible combinations which can occur for the addition of two binary digits A, B and a carry digit $C_D$ from a previous addition, and the resulting sum Z and carry digit CC:

*Table 1*

| Possibility | 1st Digit A | 2nd Digit B | Carry digit from a previous addition $C_D$ | $X=A+B+C_D$ | Carry digit to be carried to next column C | Sum $Z=X-2C$ |
|---|---|---|---|---|---|---|
| 1 | 0 | 0 | 0 | 0 | 0 | 0 |
| 2 | 1 | 0 | 0 | 1 | 0 | 1 |
| | 0 | 1 | 0 | | | |
| | 0 | 0 | 1 | | | |
| 3 | 0 | 1 | 1 | 2 | 1 | 0 |
| | 1 | 0 | 1 | | | |
| | 1 | 1 | 0 | | | |
| 4 | 1 | 1 | 1 | 3 | 1 | 1 |

It will be seen from the above table that the sum Z, given in the last column is always equal, on a numerical basis, to the sum X of the digits A, B and $C_D$ minus twice any digit C which is to be carried over to the addition of the next pair of digits in the binary numbers.

A block-schematic arrangement for deriving the four possible combinations of answer Z and carry digit C is shown diagrammatically in Figure 4 of the accompanying drawing. The pulses corresponding to digits A, B and $C_D$ (if present) are added in amplitude in an amplitude adding circuit 1 and the resultant pulse fed to an amplitude discriminating circuit 2 which produces a single pulse of unit amplitude (corresponding to a digit to be carried, C) if the combined amplitude $A+B+C_D$ is greater than approximately 1½ units. The carry digit C is thus only produced for possibilities 3 and 4 of the above table. A second amplitude discriminating circuit 4, arranged to produce an output pulse for inputs greater than approximately one half the standard pulse amplitude, is fed with the resultant pulse obtained by amplitude addition, in the amplitude adding circuit 3, of the pulses corresponding to digits A, B and $C_D$ and a reverse polarity double amplitude (−2C) of any carry digit pulse C. An output pulse is thus only obtained from the amplitude discriminating circuit 4 in the case of possibilities 2 and 4 of the above table, and corresponds to the answer Z.

In the practical realization of the system of Figure 4, shown in Figure 3, the addition of A, B and $C_D$ and the amplitude discrimination is performed by diodes D9—D14 and valve V7 and the addition of A, B, $C_D$ and −2C and the subsequent amplitude discrimination is performed by diodes D15—D22 and valve V9. Valves V12, V13 and associated diodes provide the carry circuit which accepts a carry digit C and stores it until the next digit period, to become the carry digit $C_D$.

"1" digits are represented in the circuit by pulses which are negative-going from a normal or resting level which is slightly above earth, e. g. +3*v* and the pulses are utilised as switching voltages to control preset currents instead of being added or subtracted directly. Each switching unit comprises a diode pair, such as D9 and D10 with a common resistor such as R1. The diode pairs D9, D10; D11, D12 and D13, D14 are associated with a common resistor R2 connected to the positive H. T. supply, and the junction of this resistor and the diodes D10, D12 and D14 is connected to the control grid of the valve V7, so that valve is normally conducting with a given amount of grid current flow to its control grid through resistor R2. The pulses representing the digits A from the cathode ray tube store and coming from the cathode of valve V2 are fed to the anode of diode D9, while the pulses representing the digits B, coming from the external source 30 are applied to the anode of diode D11, and the pulses representing the carry digits $C_D$ from valve V13 are fed to the anode of diode D13. Consider the action of one diode pair such as D9 and D10. In the quiescent condition diode D9 will be conducting and the common cathode potential of the two diodes will be held a little above the approximately earth potential of the control grid of valve V9 whereby diode D10 is cut off and the current flow through resistor R1 is entirely by way of diode D9. When a negative computer pulse (a "1" digit) is fed to diode D9, that diode is cut-off and the current which originally flowed through D9 and R1 must now flow through D10 and R1 and must subtract from the grid current flow through resistor R2 to the grid of valve V7 if the grid voltage of V7 is not to change appreciably. Each A, B or $C_D$ digit occurring, thus causes subtraction of one unit of grid current flow from the grid of valve V7 through agency of the appropriate diode pair, the current flow subtracted as a result of simultaneously occurring digits being additive. The resistor R2 is so chosen in value that 1½ units of grid current is flowing through valve V7 when no input pulses occur. When however, more than 1½ units of grid current are sought to be diverted from the grid of valve V7 as a result of the simultaneous occurrence of two or three of the digits A, B and $C_D$, all of the available grid current is subtracted whereupon the current through resistor R2 increases and the valve V7 is cut off to cause a positive pulse (C) limited to +50 volts by diode D8, to appear at the anode. This positive pulse is fed to the control grid of a cathode follower valve V8 and the pulse across the cathode load resistance of this valve provides the carrying digit C which is fed to the carry digit store V12—V13 and to the second amplitude adder.

It will be noticed that, the diodes D9—D14 which are adding negative pulses are similarly connected and have the switched resistors R1 returned to a negative voltage source. A positive pulse can be caused to subtract from the resultant effect by returning the appropriate switched resistor to a positive voltage source and reversing the switching diodes.

The addition of pulses corresponding to digits A, B and $C_D$ and the subtraction of a pulse corresponding to 2C is performed by the diode pairs D15, D16; D17, D18; D19, D20; D21, D22 in conjunction with valve V9. The diode pairs D17, D18; D19, D20 and D21, D22 in conjunction with switched resistors R1 function in exactly the same manner as the previously described diode pairs D9—D14 and are fed with the pulses corresponding to digits A, B and $C_D$, while diodes D15, D16 are reversely connected and have the value of the switched resistance R3 so adjusted that a subtraction of two units (by addition of two extra units of permissible grid current flow to valve V9) occurs for a C pulse which is fed to diode D15 from the cathode load resistance of a cathode follower valve V8. The common resistor R2′ has its value so selected that it is effective to provide a ½ unit flow of grid current to the grid of valve V9 when no input pulses occur. This results in valve V9 being cut-off when $A+B+C_D-2C$ is greater than ½. Selection of the value ½ gives adequate discrimination between the cases when $A+B+C_D-2C$ are 0 and 1 and thus a positive pulse limited to +50 volts by the diode D23 is developed at the anode of valve V9 in those instances when the answer "Z" should be a "1." This positive pulse is fed to the control grid of valve V10 which has negative going dash pulses fed to its anode via terminal 37 and diode D25. Thus there is developed at the anode of valve V10 a negative going computer pulse whose trailing edge is defined coincidentally with the trailing edge of the dash pulse fed via terminal 37. The pulse at the anode of valve V10 is fed to the cathode follower valve V11. A diode D24 is provided to fix the positive limit of the anode voltage excursion of V10. The negative computer pulses across the cathode load resistance of valve V11 provide the feed to the grid of valve V3 in the gate circuit, so that when, as a result of an addition operation a "1" is obtained as the answer digit a dash is written into the cathode ray tube store.

The operation of the carry digit store circuit comprising valves V12 and V13 remains to be described. Each positive pulse (C) obtained from the cathode follower valve V8 is differentiated and fed to the control grid of the valve 12 via a diode D26 so that valve V12 is cut-off by the trailing edge of the pulse and by virtue of the condenser C2 in the grid circuit remains cut off until the occurrence of the strobe pulse, corresponding to the next digit period, which is fed in positive-going sense via terminal 38 and diode D27. When anode current commences to flow again in valve V12, the negative-going trailing edge of the pulse at the anode which is fed through diode D28 to the grid of the cathode follower valve V13 drives the grid of valve V13 negative. On account of the condenser C3 the grid of valve V13 then remains negative until the end of the dash period when the grid is driven positively by the trailing edge of positive going dash pulses fed via terminal 39 and diode D29 to the grid. The cathode follower valve V13 thus delivers a negative computer pulse (the carry digit $C_D$) one digit period later than the digit C was applied to the circuit and the performance of the circuit is unaffected by small variations of the digit period.

The circuit arrangement described above with reference to Figures 3 and 4 may be readily modified so that subtraction occurs in the circuit interposed between the cathode of valve V2 and the control grid of valve V3, whereby the number (B) fed into the circuit is subtracted from the number (A) existing in the cathode ray tube storage unit and the resultant number (Z) is written into the store. The modifications required relate only to the circuit comprising valves V7—V13 and are simply those re-arrangements of the pulse amplitude adding and level discriminating circuits necessary to comply with the rules of binary arithmetical subtraction.

The rules of subtraction are summarised in the Table 2 below which sets out the possible combinations occurring for the subtraction of one digit B from another digit A, with the possible existence of a "borrowed" digit $C_D$, carried over from the step of subtraction of the preceding digits in the numbers.

*Table 2*

| Possibility | 1st Digit A | 2nd Digit B | Borrowed digit from previous subtraction $C_D$ | $Y=A-B-C_D$ | Borrowed digit to be carried to next column C | Difference $Z=Y+2C$ |
|---|---|---|---|---|---|---|
| 1 | 0 | 1 | 1 | −2 | 1 | 0 |
| 2 | 0 | 1 | 0 | −1 | 1 | 1 |
| | 0 | 0 | 1 | | | |
| | 1 | 1 | 1 | | | |
| 3 | 0 | 0 | 0 | 0 | 0 | 0 |
| | 1 | 1 | 0 | | | |
| | 1 | 0 | 1 | | | |
| 4 | 1 | 0 | 0 | 1 | 0 | 1 |

It will be seen that the answer Z is always given by Y plus twice the "borrowed" digit C which is carried to the next subtraction, where Y is equal to $A-B-C_D$.

A circuit in block schematic form arranged to perform this subtraction process is indicated schematically in Figure 5. Pulses corresponding to the digits A and reverse polarity pulses corresponding to the digits B and $C_D$ are added in amplitude in an amplitude adding device 1 and fed to an amplitude discriminator 2 which provides an output pulse which represents the digit C which is to be borrowed, when $A-B-C_D$ is greater (in negative sense) than $-\frac{1}{2}$. A C digit pulse is thus produced in the cases of the possibilities 1 and 2 set out in Table 2. A second amplitude adder 3 is fed with pulses corresponding to A, −B and $-C_D$ and a double amplitude pulse representing +2C, the resultant being fed to the second amplitude discriminator 4 which provides an answer pulse corresponding to "1" (for possibilities 2 and 4 set out in Table 2), when the resultant $A-B-C_D+2C$ is greater than $\frac{1}{2}$.

The practical realisation of the schematic arrangement of Figure 5 is illustrated in Figure 6 which is similar to the circuit of Figure 3. For simplicity, however the digits "1" are represented in the actual computing circuit by positive-going computer pulses instead of negative-going computer pulses as in the circuit of Figure 3. Valves V1—V4 of Figure 6 perform exactly the same functions as the corresponding valves of Figure 3 but the phase-reversing valve V10 precedes valve V2 so that the digit pulses (A) read from the store and obtained at the cathode of valve V2 are positive-going. The digits B, fed into the circuit from the external source and the "borrowed" digits C and $C_D$ are represented by negative pulses, so that the −B and $-C_D$ significances are obtainable without inversion.

The diodes D9—D14 and the associated switch resistors are arranged, as explained with reference to Figure 3, to perform the addition of A, −B and $-C_D$ pulses, the $C_D$ pulse being derived from the carry circuit V12—V13 which is identical with the corresponding circuit of Figure 3 and is not shown in detail. Any "borrow" digit C appearing at the cathode of valve V8 is positive-going and the diodes D14—D23 and their corresponding switched resistors are arranged for the addition of positive A and C pulses (the resistor associated with diodes D14, D15 being arranged to add two units for every C pulse) and negative B and $C_D$ pulses. Valve V9 is cut off when the circuit is quiescent, the resistor connecting its grid to the negative H. T. source being so arranged that a negative pulse is obtained at the anode only when $A-B-C_D+2C$ is greater than $\frac{1}{2}$ i. e. is nominally equal to one unit of amplitude. The negative pulse (the answer Z) at the anode of V9 is then fed without polarity reversal, to the grid of cathode follower valve V11, where it is reshaped on the back edge by dash pulses and fed to the control grid of valve V3 as previously described.

Although this invention has been described with reference to the type of storage system in which the binary digits "0" and "1" are represented as dots and dashes on a cathode ray tube screen, the digits may equally well be stored as gaps in a positive charge trace on a cathode ray tube screen as explained in Patent Application Ser. No. 790,879, filed December 10, 1947, by Frederic C. Williams, and described in the aforementioned paper as the "anticipation" method. The digits may also be stored as focussed and defocussed spots on a cathode ray tube described in the said paper as the "focus-defocus" method.

In the appended claims the word "number" is also intended to mean a "routing instruction" that is a number which controls the transfer of a number or numbers from one part of a computing machine to another part while the term "algebraic addition" is intended to denote either positive addition or negative addition, i. e. subtraction.

We claim:

1. A digital computing apparatus employing a cathode ray tube store for information to be employed in computation and comprising a cathode ray tube store device having a storage screen, a signal pick-up electrode adjacent to said screen, controlling means for controlling the irradiation of said screen, a regeneration circuit responsive to signals from said pick-up electrode, circuit connections between said regeneration circuit and said controlling means whereby information stored on said screen may be regenerated, said regeneration circuit including a computation circuit responsive to signals from said pick-up electrode (store) and to signals from an external source to supply a signal to said controlling means which is a mathematical function of said two input signals.

2. In a cathode ray tube storage system in which information in binary digital form is recorded by an electron beam as a charge pattern on the tube screen and of the kind comprising a signal pick-up electrode adjacent to said screen, controlling means for controlling the irradiation of said screen, a regeneration circuit connected between said pick-up electrode and said controlling means; the provision in said regeneration circuit of computation circuit means responsive to a train of pulse signals from said pick-up electrode and to a train of pulse signals from an external source of pulses representing information in binary digital form, to produce from said external pulse train and said pulse train derived by exploring the charge pattern a new pulse train which represents a mathematical function of said two input pulse trains and circuit means delivering said new pulse train to said controlling means to cause the electron beam in exploring the charge pattern to replace it by a new charge pattern representing the information contained in said new pulse train.

3. Electronic binary digital computing apparatus in which an electrostatic store is provided, said store comprising an insulating recording surface, means for producing an electron beam at a velocity such that, when the beam strikes said surface the number of secondary electrons liberated is greater than the number of primary electrons arriving, means for causing the beam to explore said surface, modulating means for modulating the electron beam to produce a charge pattern on said surface corresponding to modulations characteristic of a number to be recorded, signal pick-up means adjacent to said surface, a regeneration circuit responsive to signals from said pick-up means, circuit means connecting said regeneration circuit to said modulating means, said regeneration circuit including a computing circuit, means for feeding to said computing circuit signals representative of a stored number and derived from said pick-up means, means for feeding to said computing circuit signals representative of a number and derived from an external source, and means for controlling said modulating means in accordance with output signals from said computing circuit, which signals are representative of an answer number derived from a mathematical process effected between the two numbers fed into the computing circuit, thereby to store said answer number in said electrostatic store.

4. Computing apparatus according to claim 3 wherein said computing circuit is an algebraic adding circuit.

5. A digital computing apparatus employing a cathode ray tube store in which information in binary digital form is recorded by an electron beam as a charge pattern on the tube screen and comprising means for producing said electron beam at such velocity that when the beam strikes said screen the number of secondary electrons liberated is greater than the number of primary electrons arriving, means for causing the beam to scan said screen, modulating means for modulating said beam in accordance with the modulations of a pulse train signal representing the digits of a number to be stored, a signal pick-up electrode adjacent to said screen, a regeneration circuit responsive to signals from said pick-up electrode (store), circuit connections between said regeneration circuit and said modulating means whereby information stored on said screen may be regenerated, said regeneration circuit including a computation circuit responsive to signals from said pick-up electrode (store) and to pulse train signals from an external source representing information in binary digital form to supply a pulse train signal to said modulating means which is a mathematical function of said two input pulse train signals.

6. Computing apparatus according to claim 5 wherein said computing circuit is an algebraic adding circuit.

7. In an electrostatic storage system in which information is recorded by an electron beam as a charge pattern on an insulating recording surface and of the kind comprising means for producing an electron beam at a velocity such that, when the beam strikes said surface the number of secondary electrons liberated is greater than the number of primary electrons arriving, means for causing the beam to explore said surface, modulating means for modulating the electron beam to produce a charge pattern on said surface corresponding to modulations characteristic of the information to be recorded, a signal pick-up electrode adjacent to said surface, and a regeneration circuit responsive to signals from said pick-up electrode and connected to said modulating means; the provision in said regeneration circuit of means responsive to signals from said pick-up electrode and to signals from an external source of pulses representing information in binary digital form to supply a signal to said modulating means which is a mathematical function of said two input signals, to cause the electron beam in exploring the charge pattern to replace it by a new charge pattern representing the information contained in said new signal.

8. A digital computing apparatus comprising storage means including a source of an electron beam, control means controlling the activity of said beam, and a storage surface in the path of said beam; a pick-up electrode adjacent said storage surface, a gating circuit coupled to said pick-up electrode including means responsive to signals from said pick up means, a mathematical computation circuit coupled to said gating means and having an output, a source of external signals coupled to said computation circuit, said computation circuit including means producing a signal in said output which is a mathematical function of said external signal and said pick-up signal, and means coupling said output to said control means.

9. A digital computing apparatus comprising storage means including a source of electrons, a storage surface, means accelerating said electrons toward said surface, control means controlling the activity of said electrons, and sweep means causing said electrons to bombard said surface in a predetermined pattern of charge distribution, a pick up electrode adjacent said surface having signals thereon representative of information stored on said surface, a regeneration circuit coupled to said pick up electrode, a mathematical computation circuit coupled to said pick up electrode, a source of external signals coupled to said computation circuit, said computation circuit including means producing a signal representative of a mathematical function of said external signals and said pick-up signals, and means coupling the outputs of said regeneration circuit and said computation circuit to said control means.

10. The apparatus claimed in claim 9 in which said computation circuit is a binary digital algebraic addition circuit.

11. The apparatus claimed in claim 9 in which said sweep means includes means causing said beam to explore said surface in a predetermined pattern, said pick-up electrode having a first train of pulses thereon representative of a first binary number stored upon said storage surface, said source of external signals producing a second train of pulses representative of a second binary number, said computation means including means responsive to pulses of said first and second trains and producing a third train of pulses representative of a mathematical function of said first and second binary numbers, said control means including means responsive to said third train of pulses to modulate said accelerated electrons.

12. A digital computing apparatus comprising storage means including a source of electrons, a storage surface, means causing electrons from said source to bombard said surface in a predetermined pattern, control means controlling the activity of said bombarding electrons, a pick-up electrode adjacent said surface having signals thereon representative of information stored on said surface, a regeneration circuit coupled to said pick up electrode and having an output coupled to said control means, said regeneration circuit including a computation circuit, a source of external signals coupled to said computation circuit, said computation circuit including means responsive to said external signals and to said pick-up signals and producing an output signal representative of a mathematical function of said two input signals, said control means including means responsive to signals in the output of said regeneration means to vary the activity of said electrons in accordance therewith.

FREDERIC C. WILLIAMS.
TOM KILBURN.

References Cited in the file of this patent

"A Memory Tube," Andrew V. Hueff, Electronics, Sept. 1947; pages 80–83.

"A Dynamically Regenerated Electrostatic Memory System," Eckert, Lukoff, et al., I. R. E. Proceedings, May 1950; pages 498–514.